March 5, 1963    L. I. KAPLAN    3,079,660
CLAMP HAVING STAMPED HOOK BOLT
Filed March 28, 1960
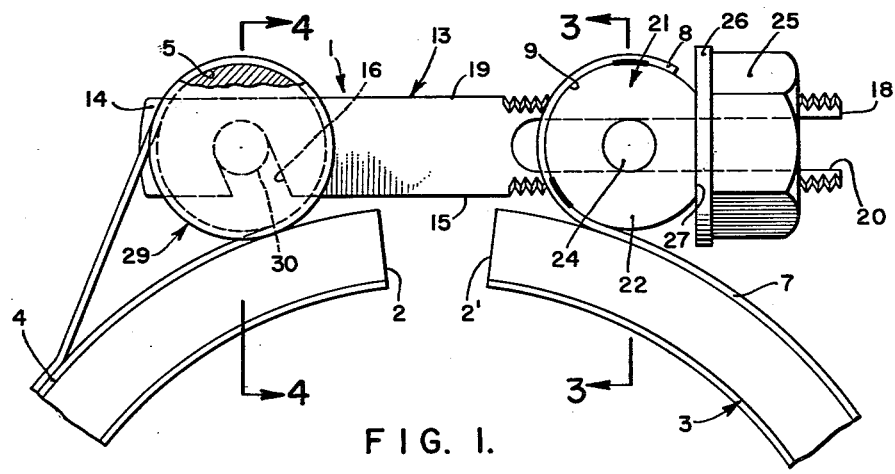
FIG. 1.
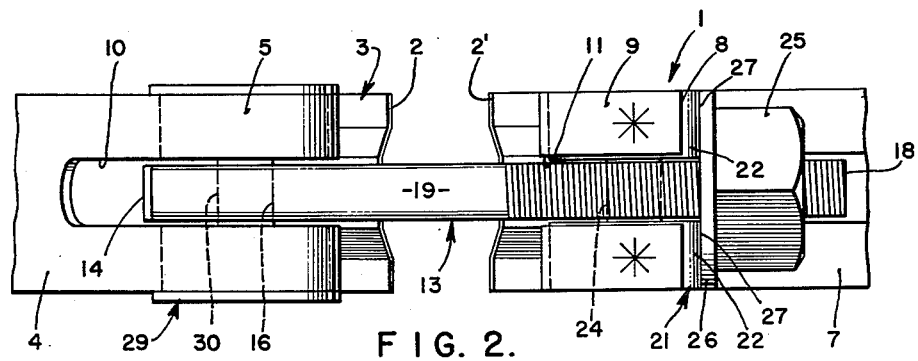
FIG. 2.
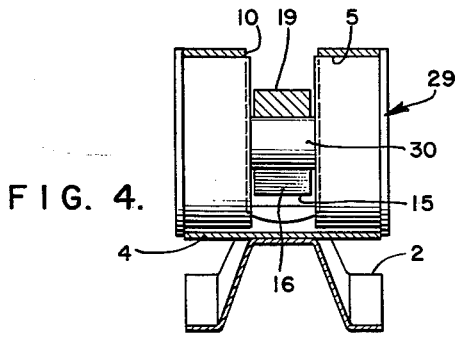
FIG. 4.
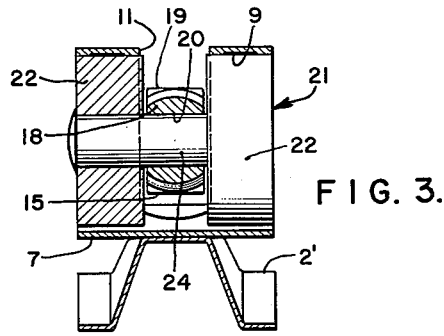
FIG. 3.
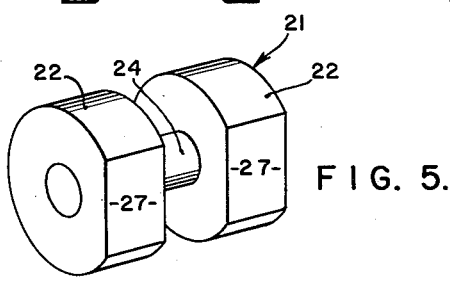
FIG. 5.
LEO I. KAPLAN
*INVENTOR.*
BY 
ATTORNEYS.

United States Patent Office 3,079,660
Patented Mar. 5, 1963

3,079,660
CLAMP HAVING STAMPED HOOK BOLT
Leo I. Kaplan, Sunland, Calif., assignor to Poly Industries, Inc., Pacoima, Calif., a corporation of California
Filed Mar. 28, 1960, Ser. No. 17,811
2 Claims. (Cl. 24—279)

This invention relates to a clamping mechanism for band couplings and more particularly to a clamping mechanism incorporating a stamped hook bolt.

In the prior clamp practice, both hook bolts and T-bolts have been made by cold heading and cold forging processes which require expensive equipment. Relative to the manufacture of T-bolts from a piece of wire or rod stock by the cold heading process, it has been empirically determined that T-bolt heads made by this process are generally limited in size to a maximum volume equal to the cross-sectional area of the stock multiplied by a figure equal to four times the diameter of the stock, and to a maximum length equal to four times the diameter of the stock. To give T-bolt heads an additional bearing surface, both by increased length and by increased diameter for use in band connector mechanisms, journal bearings, as disclosed in United States Letters Patent No. 2,893,097 to Hill et al., have been secured on the opposite ends of the head. The addition of these bearing surfaces has the obvious disadvantage of requiring two extra pieces and their assembly on the head. These problems and disadvantages in the manufacture of T-bolts have led to the use of hook bolts. Commonly the hook bolts used also have been made by a cold heading process after which the hook notch was cut into the head and the other end of the bolt threaded. Hook bolts produced by this practice have been relatively expensive.

According to the present invention hook bolts are made by a stamping or blanking process considerably less expensive than cold forging, both in the cost of the equipment and in the time consumed. The bolts are blanked from sheet metal by a die, the hook notch and any other slots or holes being stamped by the same die in a one-step operation. Only the two opposite edges of the flat-sided bolt need to be threaded and this is accomplished by a second stamping operation. Bolts so produced find particular usefulness in latching mechanisms incorporated in coupling devices employed to hold flanged tube sections in axial alignment and sealed relationship and in which light weight and low cost are important. Additionally, such bolts being flat-sided, have the added advantage in such uses in that they can be seated in seats and slots of lesser width resulting in a stronger and more rigid construction without increase in overall dimensions.

Accordingly, it is a primary object of the present invention to provide an improved clamping mechanism for band couplings.

It is a principal obect of the present invention to provide an inexpensive hook bolt for clamping mechanisms which can be stamped from sheet metal stock.

It is another object of the invention to provide an improved overcenter type latch in which a stamped, flat-sided, slotted hook bolt is the latching member.

It is still another object of the invention to provide an improved hook bolt for use in band clamping mechanisms in which the hook bolt bridging the two ends of a split band serves to tighten and draw the ends together in the absence of a conventional trunnion unit having a threaded shank.

Still another obect of the invention is the provision of a stamped hook bolt one end of which is slotted and threaded for the seating of a cross pin and nut at one side of a split band clamp.

These and other more specific objects will appear upon reading the following specification and claims and upon considering in connection therewith the attached drawings to which they relate.

Referring now to the drawings in which a preferred embodiment of the invention is illustrated.

FIGURE 1 is a side elevational view of a clamping mechanism incorporating a stamped hook bolt made in accordance with the present invention;

FIGURE 2 is a top plan view of the structure shown in FIGURE 1;

FIGURE 3 is a partial sectional view taken in the direction of the arrows 3—3 of FIGURE 1;

FIGURE 4 is a similar sectional view taken in the direction of the arrows 4—4 of FIGURE 1;

FIGURE 5 is a perspective view of a spool guide which cooperates with the hook bolt nut.

Referring again to the drawings, in FIGURES 1 through 5 there is illustrated a clamping mechanism 1 employed to secure the opposite ends 2, 2' of a V-type band 3 in closed position. An outer flexible band or strap 4 is welded to the V band 3 adjacent end 2 and has its end looped back and permanently secured to form loop 5. End 2' of band 3 has a strap 7 welded to it with its end 8 turned back to form a partial loop 9. The loop 5 and partial loop 9 are bifurcated by central slots 10 and 11, respectively, extended lengthwise of the straps.

The clamping mechanism 1 includes, in cooperation with loop 5 and partial loop 9, a flat-sided hook bolt 13 stamped from a piece of sheet metal. At the outer end 14 of bolt 13 an inclined open-ended slot 16 extends inwardly from its lower edge 15 to form a hook normally positioned in the slot 10 of loop 5. The opposite or inner end 18 of bolt 13 has its lower and upper edges 15 and 19 threaded and an elongated open-ended slot 20 extends longitudinally inwardly from end 18 between the upper and lower threaded surfaces of the bolt. A spool 21 having spaced end flanges or discs 22, 22 is welded in partial loop 9, the flanges 22 being positioned upon opposite sides of strap slot 11 and being connected by a small diameter pin 24 which seats slidably in the bolt slot 20. A nut 25 threadedly engages the threaded end 18 of bolt 13 and bears against a washer 26 abutting parallel, outwardly facing flat surfaces 27 on the spool ends 22, the plane of the surfaces being normal to the longitudinal axis of the bolt. Positioned in loop 5 is trunnion 29 generally similar to spool 21 having enlarged ends and a reduced central portion or pin 30 in alignment with slot 10. With bolt 13 in engaged position, its end extends into slot 10 of loop 5 and engages pin 30.

To tighten band 3, that is to draw ends 2, 2' together, nut 25 is tightened on bolt 13 to force spool 21 and the partial loop 9 in which it is seated toward the hook end 14 of the bolt. With the hook bolt engaged with pin 30 of trunnion 29, loop 5 will be drawn toward spool 21 and the partial loop 9 by which it is encircled. Loosening nut 25 removes the force drawing the ends 2 and 2' of the V band together and permits them to separate. To open the clamp completely requires the disengagement of the hook slot 16 of the bolt 13 from trunnion 29 which is readily accomplished by pivoting the bolt about the pin 24 as an axis after the nut 25 has been retracted sufficiently.

Hook bolt 13 is blanked or stamped from a piece of sheet metal. In the process a single die may stamp out a great many flat-sided blanks from relatively heavy sheet metal stock, the inclined slot 16 forming the hook at one end and the longitudinal slot 20 at the other end being formed at this time. The threads in the opposite edges are stamped into the blank in a second one-step operation. The resulting structure is the bolt 13 previously described. The threads at the upper and lower edges of the shank provide the necessary threaded seat for the nut 25 while their elimination at the sides, together with the curved sides of the usual bolt, results in a narrow bolt acceptable into slots 10 and 11 of reduced width in the band straps. A stronger unit results.

While the particular hook bolt in combination with clamping devices herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. In a closure mechanism for tightening a split band clamp having a turned-back strap at its respective ends, pin means seated in each of said turned-back straps, a hook bolt stamped from heavy gauge sheet metal of rectangular shape in cross-section, said hook bolt having a first slot forming a hook opening at an angle to one edge of said bolt near one end thereof and an elongated slot extending axially from the other end of said bolt, screw threads crosswise of the lateral edges of said bolt opposite said elongated slot, said first slot seating one of said pin means, said elongated slot slidably engaging the other of said pin means, and a nut threaded on said bolt and bearing against the pin means seated in said elongated slot.

2. The invention according to claim 1 characterized in that said pin means in said elongated slot have flat portions parallel to the adjacent end surface of said nut.

References Cited in the file of this patent
UNITED STATES PATENTS

| | | |
|---|---|---|
| 1,679,236 | Wilson | July 31, 1928 |
| 2,677,866 | Tetzlaff | May 11, 1954 |
| 2,820,972 | Ptak | Jan. 28, 1958 |
| 2,920,370 | Guy | Jan. 12, 1960 |

FOREIGN PATENTS

| | | |
|---|---|---|
| 549,701 | France | Nov. 27, 1922 |
| 189,626 | Great Britain | Dec. 7, 1922 |